(12) United States Patent
Salama et al.

(10) Patent No.: US 12,578,253 B2
(45) Date of Patent: Mar. 17, 2026

(54) BULK FLUID WASH MODULE

(71) Applicant: LEICA BIOSYSTEMS MELBOURNE PTY LTD, Mt Waverley (AU)

(72) Inventors: Andrew Salama, Melbourne (AU); Timothy Ian Spink, Melbourne (AU); Matthew Cuce, Gold Coast (AU); Daniel Fraser, Melbourne (AU)

(73) Assignee: LEICA BIOSYSTEMS MELBOURNE PTY LTD, Mt Waverly (AU)

( * ) Notice: Subject to any disclaimer, the term of this patent is extended or adjusted under 35 U.S.C. 154(b) by 636 days.

(21) Appl. No.: 17/278,970

(22) PCT Filed: Dec. 19, 2019

(86) PCT No.: PCT/AU2019/051408
§ 371 (c)(1),
(2) Date: Mar. 23, 2021

(87) PCT Pub. No.: WO2020/124155
PCT Pub. Date: Jun. 25, 2020

(65) Prior Publication Data
US 2022/0026320 A1      Jan. 27, 2022

(30) Foreign Application Priority Data

Dec. 20, 2018    (AU) ................................. 2018904865

(51) Int. Cl.
*G01N 1/31*              (2006.01)
*B01L 3/00*              (2006.01)
(Continued)

(52) U.S. Cl.
CPC .............. *G01N 1/312* (2013.01); *B01L 3/527* (2013.01); *G01L 19/0092* (2013.01);
(Continued)

(58) Field of Classification Search
CPC ............. G01N 1/312; G01N 35/00029; G01N 35/1004; G01N 2001/317;
(Continued)

(56) References Cited

U.S. PATENT DOCUMENTS 5,830,413  A      11/1998  Lang et al.
7,850,912  B2    12/2010  Favuzzi et al.
(Continued)

FOREIGN PATENT DOCUMENTS

CN          105980828 A      9/2016
WO        2013/071357 A2     5/2013
(Continued)

OTHER PUBLICATIONS

Office Action issued Dec. 11, 2023 in European Application No. 19 900 687.5.

(Continued)

*Primary Examiner* — Samuel P Siefke
(74) *Attorney, Agent, or Firm* — Kinney & Lange, P.A.

(57)          ABSTRACT

A bulk fluid wash module for an automated treatment apparatus for treating tissue samples disposed on slides, the bulk fluid wash module comprising: a body; a cavity disposed in the body, the cavity configured to receive a plurality of bulk fluids dispensed from a plurality of probes of a bulk fluid robot of the automated treatment apparatus, whereby the plurality of probes are configured to dispense the bulk fluids to the slides and to the cavity; and a scavenger port disposed in the body, the scavenger port in fluid communication with the cavity and configured to remove the bulk fluids from the cavity.

15 Claims, 3 Drawing Sheets

(51) Int. Cl.
| | |
|---|---|
| *G01L 19/00* | (2006.01) |
| *G01N 35/00* | (2006.01) |
| *G01N 35/10* | (2006.01) |

(52) U.S. Cl.
CPC ... *G01N 35/00029* (2013.01); *G01N 35/1004* (2013.01); *B01L 2300/0663* (2013.01); *G01L 2019/0053* (2013.01); *G01N 2001/317* (2013.01); *G01N 2035/00138* (2013.01)

(58) Field of Classification Search
CPC .......... G01N 2035/00138; B01L 3/527; B01L 2300/0663; G01L 19/0092; G01L 2019/0053
See application file for complete search history.

(56) References Cited

U.S. PATENT DOCUMENTS

| | | | |
|---|---|---|---|
| 7,875,245 B2 | 1/2011 | Favuzzi et al. | |
| 2014/0315256 A1 | 10/2014 | Dockrill et al. | |
| 2016/0282374 A1 | 9/2016 | Barnett et al. | |
| 2019/0234843 A1* | 8/2019 | Capps ............. | G01N 35/00029 |

FOREIGN PATENT DOCUMENTS

| | | | |
|---|---|---|---|
| WO | 2014/066947 A1 | 5/2014 |
| WO | 2015/086484 A1 | 6/2015 |
| WO | 2015/086534 A1 | 6/2015 |
| WO | 2019/119037 A1 | 6/2019 |

OTHER PUBLICATIONS

Extended European Search Report dated Oct. 15, 2021 from the European Patent Office in EP Application No. 19900687.5.
Chinese Office Action dated Jan. 31, 2024 in Application No. 201980063284.X.
International Search Report of PCT/AU2019/051408 dated Jan. 29, 2020 [PCT/ISA/210].
Written Opinion of PCT/AU2019/051408 dated Jan. 29, 2020 [PCT/ISA/237].
Chinese Rejection Decision for Chinese Patent Application No. 201980063284.X, dated Jan. 4, 2025, 24 pages.

* cited by examiner

BULK FLUID WASH MODULE

CROSS REFERENCE TO RELATED APPLICATIONS

This application is a National Stage of International Application No. PCT/AU2019/051408 filed on Dec. 19, 2019, claiming priority based on Australian Patent Application No. 2018904865 filed on Dec. 20, 2018.

TECHNICAL FIELD

The present invention relates to a bulk fluid wash module for an automated treatment apparatus for treating tissue samples disposed on slides. The automated treatment apparatus comprises a bulk fluid robot comprising a plurality of probes configured to dispense bulk fluids to the slides. In particular, but not exclusively, the bulk fluid wash module comprises a cavity configured to receive the bulk fluids dispensed from the probes and a scavenger port configured to remove the bulk fluids from the cavity.

BACKGROUND OF INVENTION

Instrumentation for automated treatment of biological samples, such as anatomical pathology samples, is well known. Treatment may comprise staining procedures of the kinds that are typical in immunochemistry, in-situ hybridisation, special staining and cytology. Automation of some staining procedures has increased the speed with which pathology testing can be completed leading to earlier diagnosis and in some cases, intervention. Staining is typically performed on samples placed on microscopy slides to highlight certain histological features in a biological sample and incubation of the sample with small volumes of reagent is often performed. In many cases, automated staining of samples involves manipulation of robotic arms to deliver an aliquot of reagent to achieve staining.

In an example of an existing automated treatment apparatus in use, tissue samples are placed on slides and moved to slide treatment modules of the apparatus to be treated using reagents. The treatment of the samples here is performed automatically by one or more robots configured to dispense high value reagents to the samples on the slides in a predetermined sequence according to a staining protocol.

In addition, the apparatus includes one or more robots configured to dispense bulk fluid reagents, such as dewaxing solution and alcohol, from fluid dispensing end effectors of the robots, to treat samples on the slides before and after staining. These bulk fluids dispensed by the fluid dispensing end effectors of the robots, however, may need to be purged from the fluid dispensing end effectors, and or from the fluid lines between the fluid dispensing end effectors and the fluid containers, before other bulk fluids can be primed and then dispensed from the fluid dispensing end effectors. This may cause delay, wastage, ineffective and inefficient use of the automated treatment apparatus. For example, following an event such as turning the apparatus on or off whilst the fluid dispensing end effectors are primed with bulk fluids, the presence of air bubbles may form and become trapped in the fluid dispensing end effectors. These air bubbles may interfere with the effectiveness of the apparatus. Further, dripping or leaking of bulk fluids may occur from the fluid dispensing end effectors in the apparatus if the bulk fluids are not dispensed immediately.

SUMMARY OF INVENTION

Accordingly, one aspect of the present invention provides a bulk fluid wash module for an automated treatment apparatus for treating tissue samples disposed on slides, the bulk fluid wash module comprising: a body; a cavity disposed in the body, the cavity configured to receive a plurality of bulk fluids dispensed from a plurality of probes of a bulk fluid robot of the automated treatment apparatus, whereby the plurality of probes are configured to dispense the bulk fluids to the slides and to the cavity; and a scavenger port disposed in the body, the scavenger port in fluid communication with the cavity and configured to remove the bulk fluids from the cavity.

Another aspect of the present invention provides method of removing bulk fluids from a plurality of probes of a bulk fluid robot of an automated treatment apparatus for treating tissue samples disposed on slides, whereby the plurality of probes are configured to dispense the bulk fluids to the slides, the method comprising: locating the probes near a cavity of a bulk fluid wash module of the automated treatment apparatus; dispensing the bulk fluids from the probes into the cavity; and removing the bulk fluids from the cavity via a scavenger port in fluid communication with the cavity.

Preferably, the automated treatment apparatus includes one or more bulk fluid robots that are configured by a controller of the apparatus to dispense a plurality of lesser value reagents, hereinafter referred to as bulk fluids, stored in reagent containers to the slides to treat tissue samples on the slides. For example, in some cases, to treat tissue samples on the slides, a designated combination and order of high value reagents and lesser value bulk fluids are dispensed to the slides. Bulk fluids include, but are not limited to: oxalic acid, sulphuric acid, potassium permanganate, alcohol, dewaxing agent, haematoxylin, peroxide, citric acid, EDTA, DI water and Bond™ wash to treat the tissue samples disposed on the slides.

Thus, in one embodiment, the cavity is configured to receive at least part of the bulk fluid from the probes to remove the bulk fluid closest to the end of the probe to prevent dripping of this fluid from the probes.

In an embodiment, the bulk fluids are supplied to the probes via a plurality of lines connected to a plurality of bulk fluid containers and the cavity is configured to receive at least part of the bulk fluids in each of the lines as well as the probes. Thus, in one embodiment, the cavity is configured to receive all of the bulk fluid in each of the lines too so as to remove all the bulk fluids in the lines and the probes. That is, the cavity is dimensioned to receive all of the bulk fluids in the lines and the probes to reduce the risk of overflow of the bulk fluid wash module. Further, when all of the fluid is removed, all of the probes of the bulk fluid robot can thus be primed again simultaneously. Thus, the bulk fluids may need to be removed from the probes and the lines for a variety of reasons further including preventing bubbles moving in the fluid lines causing dripping or meniscus forming due to the fluid characteristics which may later be dislodged due to the bulk fluid robot moving.

Also, as mentioned, following an event such as turning the apparatus on or off, or initialising of the apparatus whilst the probes are primed with bulk fluids, air bubbles may form in the probes and lines. When the bulk fluids are removed from the probes in the above manner, the air bubbles are also removed from the probes and turnaround time for another prime of the probes of the bulk fluid robot can be decreased.

In an embodiment, the scavenger port comprises a top scavenger port configured to receive a scavenger probe configured to apply a vacuum force to remove the bulk fluids from the cavity, and the top scavenger port is chamfered to guide the scavenger probe to be received in the scavenger port. In addition, or in the alternative, the scavenger port comprises a bottom scavenger port configured to output the bulk fluids from the cavity. The bottom scavenger port is located at lower point in the body so that the bulk fluids flow to the bottom scavenger port under gravity and is located close to the cavity so that less vacuum force is required to scavenge the bulk fluids from the cavity via the top scavenger port.

In an embodiment, the cavity comprises a flow channel with a slope configured to provide a substantially uniform flow of the bulk fluids dispensed from the probes to the scavenger port. The slope of the flow channel is a constant downward slope to provide uniform flow of bulk fluids under gravity. In an example, the bulk fluids dispensed from the probes flow towards the bottom scavenger port mentioned above, and the top scavenger port is in fluid communication with a collection point adjacent the bottom scavenger port so that the scavenger probe can scavenge the bulk fluids from the cavity with vacuum force. The uniform flow also reduces the risk of accumulation of bulk fluids in the cavity. Preferably, the flow channel has a rounded bottom to prevent carryover occurring in sharp corners, prevent fluid being captured in the sharp corners, and to meet standard manufacturing methods.

In an embodiment, a first one of the probes is configured to dispense a wash fluid and the wash fluid flows through the flow channel of the cavity to remove the bulk fluids dispensed from other ones of the probes from the cavity. For example, the wash fluid is alcohol.

In an embodiment, the body comprises a top plane and the cavity is formed in the top plane, and the probes are configured to dispense the bulk fluids to the cavity near the top plane of the cavity. In one embodiment, the cavity is configured to receive the probes below the top plane of the cavity. As mentioned, the wash fluid may be alcohol and this may be used to remove bulk liquid that may have adhered to some of the probe tips when the tips of the probes are received below the top plane of the cavity.

In an embodiment, the cavity comprises a plurality of probe ports configured to receive each of the probes, respectively.

In an embodiment, the bulk fluid wash module further includes a liquid level sensor configured to sense an amount of dispensed bulk fluid in the cavity. Also, the bulk fluid wash module further includes a pressure sensor configure to sense pressure in the scavenger port. The liquid level sensor and the pressure sensor may be used to determine whether a blockage exists in the cavity.

DETAILED DESCRIPTION

Figure 1:
FIG. 1 is a representation of part of an automated treatment apparatus showing a bulk fluid wash module and a bulk fluid robot according to an embodiment of the present invention.
Figure 1:
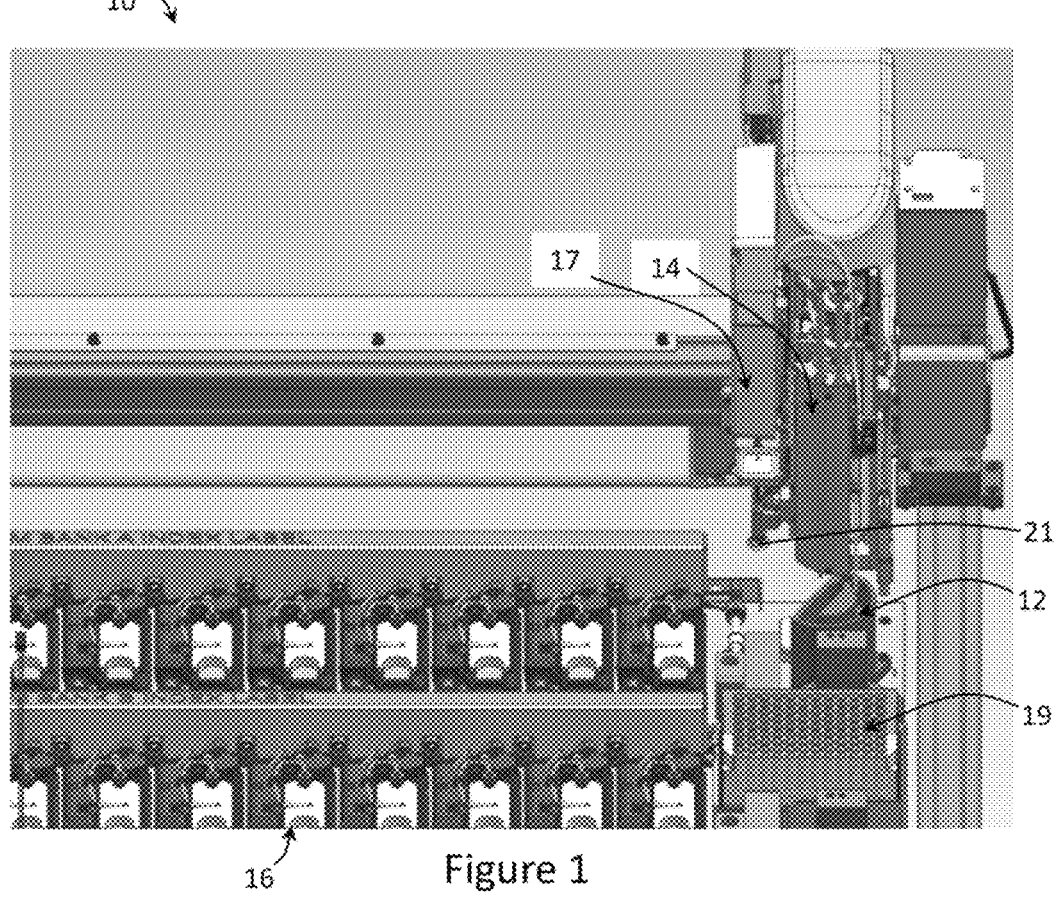

An automated treatment apparatus 10 for treating one or more tissue samples disposed on slides according to an embodiment of the present invention is shown in FIG. 1. In this embodiment, the apparatus 10 comprises a controller (not shown) that is configured to operate the apparatus 10 to automatically treat tissue samples on the slides. It will be appreciated by a person skilled in the art, however, that in other embodiments the controller can be implemented remotely from the apparatus 10.

The apparatus 10 comprises a plurality of slide treatment modules (not shown) that are arranged to receive the slides for treatment of the samples on the slides. These samples are treated by a designated combination and order of high value reagents and lesser value bulk fluids, as mentioned above, to treat and, in one example, stain the tissue samples on the slides. The apparatus 10 further comprises a bulk fluid wash module 12 configured to remove the bulk fluids used in this process from a plurality of probes of one or more bulk fluid robots (BFRs) 14 of the apparatus 10 that are configured by the controller to dispense the bulk fluids to the slides in the slide treatment modules.

A BFR 14, as shown in FIG. 1, comprises a plurality of probes with output nozzles to dispense the bulk fluids to the slides and to the bulk fluid wash module 12. That is, the BFR 14 is configured by the controller to dispense bulk fluids (e.g. bulk fluid reagents) to the slides, such as oxalic acid, sulphuric acid, potassium permanganate, alcohol, dewaxing agent, haematoxylin, peroxide, citric acid, EDTA, DI water, and Bond™ wash, to treat the tissue samples disposed thereon.

The apparatus 10 also comprises at least one pumping means (not shown) for pumping the bulk fluids to the output nozzles of the BFR 14 from containers 16 of the apparatus 10 via a plurality of lines (not shown). This process of pumping the bulk fluids to be dispensed by the BFR 14 is controlled by the controller of the apparatus 10 and is referred to as priming the BFR 14. The BFR 14 is then configured by the controller to dispense the bulk fluids in a predetermined sequence for the sides in the slide treatment modules to treat the tissue samples disposed on the slides independently. The lines are associated with each of the bulk fluids and extend from each of the containers 16 to the output nozzles of the BFR 14 via the respective pumping means.

Additionally, the apparatus 10 comprises a fluid transfer probe (FTP) robot 17 configured by the controller to dispense a plurality of high value reagents stored in high value reagent containers 19 to the slides in the slide treatment modules via an FTP nozzle disposed on the FTP robot 17. Thus, in use, the BFR 14 and the FTP robot 19 are configured by the controller to dispense bulk fluids and high value reagents in a predetermined sequence to treat the tissue samples on the slides and, in one example, stain the tissue samples according to a predetermined staining protocol for in-situ hybridization (ISH) and immunohistochemical (IHC) applications. Thus, in this way, the BFRs 17 and the FTP robot 17 are configured by the controller to dispense reagents for each of the slide treatment modules to treat (e.g. stain) tissue samples disposed on each of the slides in the slide treatment modules independently.

In an embodiment, the FTP robot 17 is also configured by the controller to move the slides in the apparatus 10 between various modules of the apparatus 10 for treating the tissue samples on each of the slides independently. The FTP robot comprises a gripper 21, such as a suction means, to grip a slide and move the slide from an input module, where an operator of the apparatus 10 introduces slides with tissue samples thereon to the apparatus 10 for treatment, to a slide treatment module so that the tissue samples on the slide can be treated or stained. To do so, the FTP robot 17 is configured by the controller to move in the x, y, z and θ (theta) axes. Also, the BFR 14 is configured by the controller to move in the x, y and z axes so that they do not interfere with the movement of the slides by the FTP robot 17. Following treatment, the FTP robot 17 moves the slides to an output module to await removal of the slides from the apparatus 10.

During treatment, bulk fluids are dispensed by the probes of the BFR 14. The bulk fluids, however, may need to be purged from the probes and or from the fluid lines between the probes of the BFR 14 and the containers 16 before other bulk fluids can be primed and dispensed from the probes. To do so, the bulk fluid wash module 12 is configured to remove bulk fluids from the probes.

FIGS. 2 to 5 show embodiments of the bulk fluid wash module 14, all of which comprise a body 18, a cavity 20 disposed in the body 18, and a scavenger port 22 disposed in the body 18. The cavity 20 is configured to receive a plurality of bulk fluids dispensed from the probes of the BFR 14 of the apparatus 10. The probes of the BFR 14 are configured by the controller to dispense the bulk fluids both to the slides and to the cavity 20. The scavenger port 22 is in fluid communication with the cavity 20 and is configured to remove the bulk fluids from the cavity 20.

As mentioned, the bulk fluids are supplied to the probes of the BFR 14 via lines connected to the bulk fluid containers 16. The cavity 20 shown in the Figures is dimensioned to receive all of the bulk fluids in each of the lines and all of the bulk fluids in the probes of the BFR 14 to reduce the risk of overflow of the bulk fluid wash module 12. In use, the probes of the BFR 14 are initially primed with bulk fluids via action of the pumping means and these bulk fluids are usually dispensed to the slides. In some circumstances, however, such as when the apparatus 10 is turned on or off, there is a need to remove all the bulk fluids from the BFR 14 so that the probes of the BFR 14 can be primed again simultaneously. Also, following an event such as turning the apparatus on or off, whilst the probes of the BFR 14 are primed with bulk fluids, air bubbles may form in the probes and lines. Removing the bulk fluids from the probes using the bulk fluid wash module 12 thus removes the air bubbles from the probes.

Figure 2:
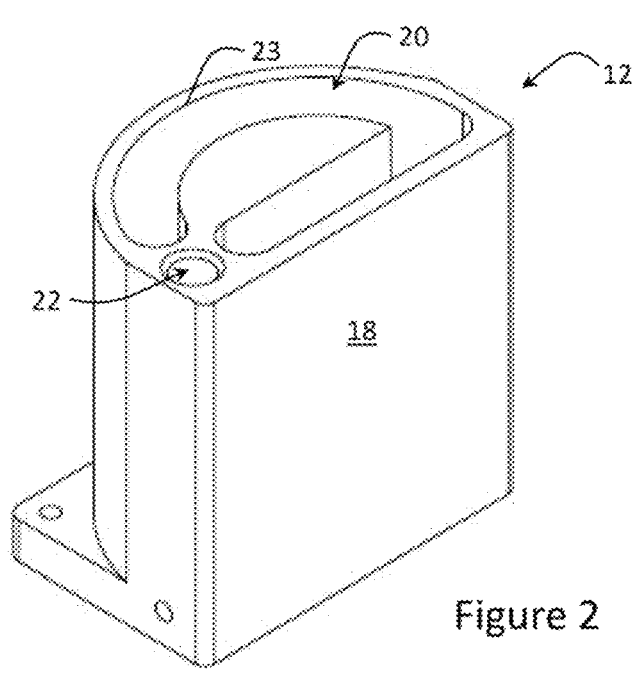
FIG. 2 is a perspective view of a bulk fluid wash module according to an embodiment of the present invention.
Figure 5:
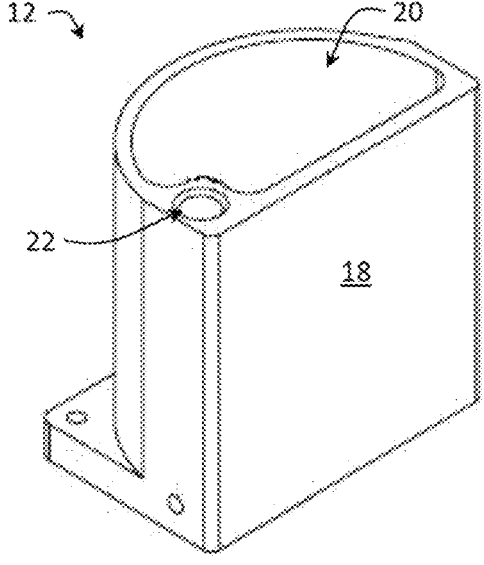
FIG. 5 is a perspective view of a bulk fluid wash module according to another embodiment of the present invention.

FIGS. 2 and 5 show alternate embodiments of the cavity 20 of the bulk fluid wash module 12. In FIG. 2, the cavity 20 comprises a slot 23 configured to receive the probes therein. In FIG. 5, the cavity 20 does not have any guide or sot for receiving the probes. It can be seen in these figures that the body 18 comprises a top plane and the cavity 20 is formed in the top plane. The probes of the BFR 14 may therefore be configured to dispense the bulk fluids to the cavity 20 near the top plane of the cavity 20, either above or below the top plane of the cavity 20. In FIG. 2, for example, the probes of the BFR 14 are configured by the controller to be located below the top plane of the cavity 20.

Figure 3:
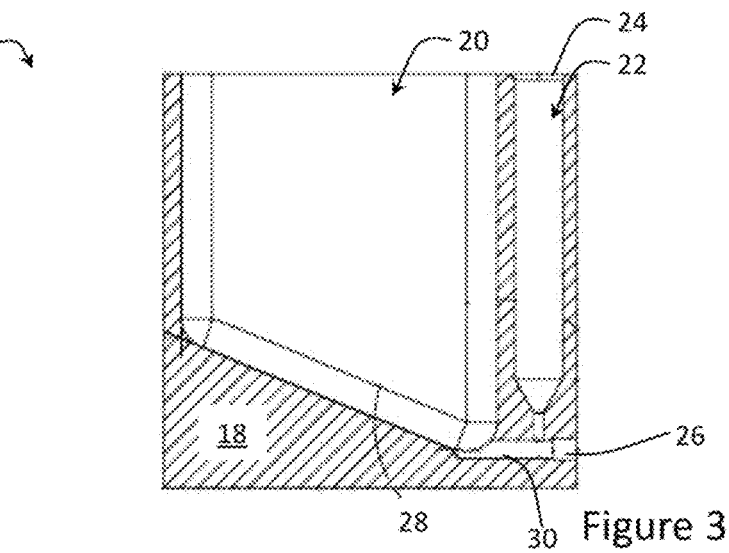
FIG. 3 is a sectional view of the bulk fluid wash module of FIG. 2.

FIG. 3 shows a sectional view of the cavity 20 of the bulk fluid wash module 12. This sectional view shows the fluid communication means between the cavity 20 and the scavenger port 22 to remove the bulk fluids from the cavity 20. Specifically, the scavenger port 22 comprises a top scavenger port 24 configured to receive a scavenger probe that is configured to apply a vacuum force to remove the bulk fluids from the cavity 20. Also, the top scavenger port 24 is chamfered to guide the scavenger probe to be received in the scavenger port 24. That is, the scavenger probe is configured by the controller of the apparatus 10 to be sealingly received in the chamfered top scavenger port 24 to apply a vacuum force to remove the bulk fluids from the cavity 20.

The scavenger port 22 further comprises a bottom scavenger port 26 that is also configured to output the bulk fluids from the cavity 20. The cavity 20 comprises a flow channel 28 configured to provide a substantially uniform flow of the bulk fluids dispensed from the probes to the bottom scavenger port 26. That is, the slope of the flow channel 28 is a constant downward slope to provide uniform flow of bulk fluids towards the bottom scavenger port 26. The top scavenger port 24 is in fluid communication with a collection point 30 adjacent the bottom scavenger port 26 so that the top scavenger probe can scavenge the bulk fluids from the cavity 20 with vacuum force. And the bottom scavenger port 26 provides that less vacuum force is required by the scavenger probe to scavenge the bulk fluids from the cavity 20.

Additionally, in use, the probes of the BFR 14 may drip bulk fluid from the probes if the bulk fluid is not dispensed immediately from the probes to the slides. To prevent this dripping, some of the bulk fluids in the probes of the BFR 14 are dispensed by the controller into the cavity 20. The cavity 20 is therefore dimensioned to receive at least part of the bulk fluids that is closest to the end of the probes to prevent dripping of this fluid from the probes.

Figure 4:
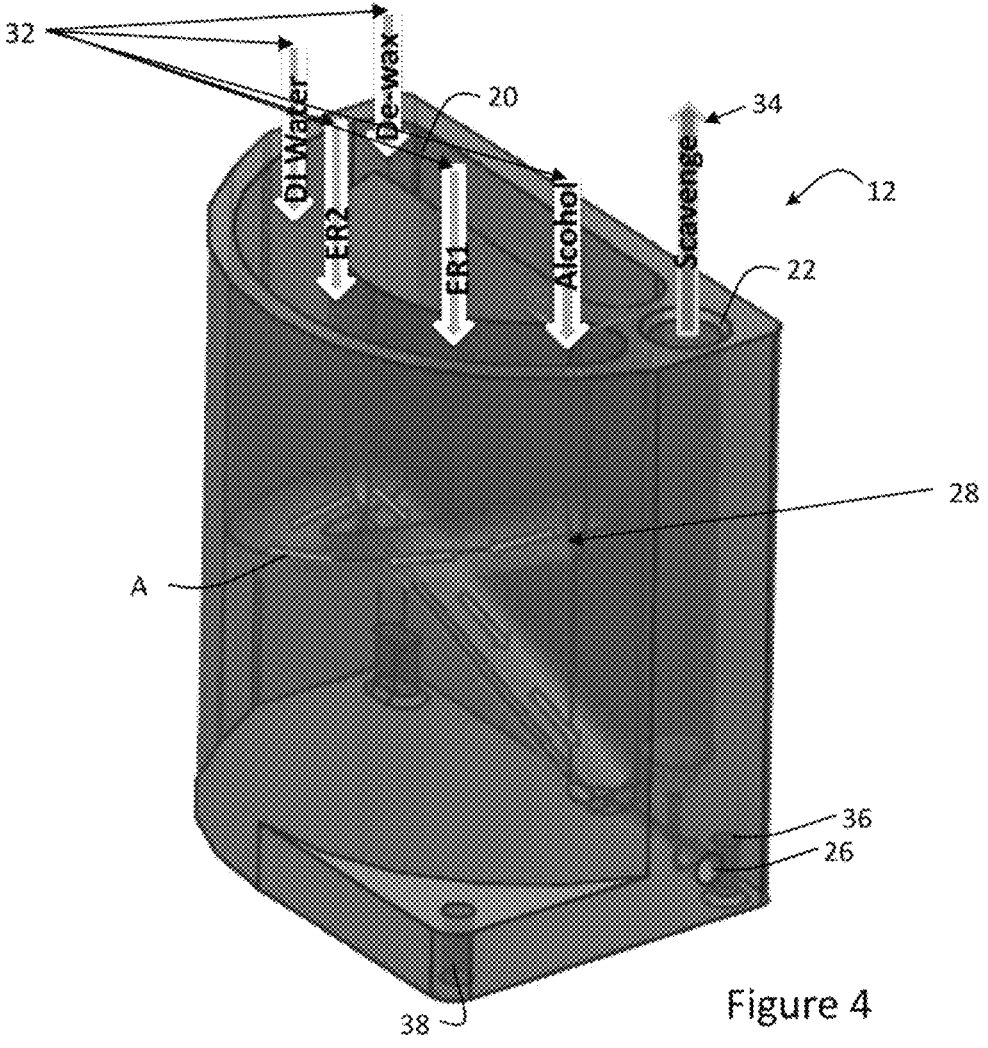
FIG. 4 is a representation of a bulk fluid wash module according to an embodiment of the present invention.

FIG. 4 shows an embodiment of the bulk fluid wash module 12 in use. Here, probes 32 are configured to dispense bulk fluid in the form of alcohol, ER1, ER2, DI Water, and De-Wax solution to the cavity 20, and a scavenger probe 34 is configured to remove the dispensed bulk fluids from the cavity 20 in the manner described above. Also, a first one of the probes 32 is configured to dispense alcohol and the alcohol flows through the flow channel 28, in the direction of arrows A under gravity, of the cavity 20 to remove the bulk fluids dispensed from other ones of the probes 32 from the cavity 20. In the embodiment where the tips of the probes 32 are located below the top plane of the cavity 20, the alcohol flows through the flow channel 28 and cleans the tips of the other probes 32.

The bulk fluid wash module 12 is configured to be easily removed from the apparatus 10 for say cleaning of the module 12 and to be installed and re-installed in the apparatus 10 by an operator. The bulk fluid wash module 12 is also made from a material that is compatible with the bulk fluids used by the apparatus 10, such as acetyl or other materials. Also, bulk fluid wash module 12 is configured to be retrofittable to other apparatuses for treating tissue samples on slides and has a shape that is configured to avoid a collision with the probes of the BFR 14 or the FTP robot 17. Locating dowel pins 36 are provided to assist an operator to locate the bulk fluid wash module 12 in the correct location in the apparatus 10. When located in the correct position, fasteners are then inserted into inserts 38 to fasten the module 12 to the apparatus 10.

Figure 6:
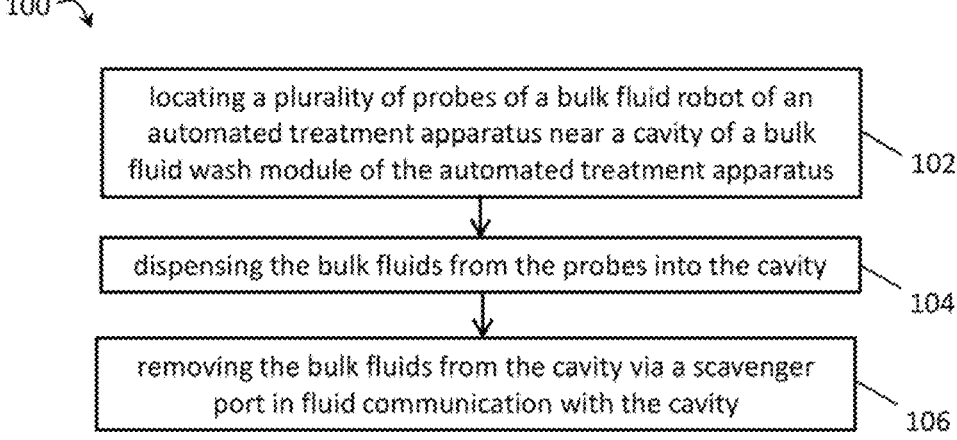
FIG. 6 is a flow chart of a method of removing bulk fluids from a plurality of probes of a bulk fluid robot of an automated treatment apparatus according to an embodiment of the present invention.

Referring now to FIG. 6, there is shown a flow chart summarising a method 100 of removing bulk fluids from a plurality of probes of a bulk fluid robot of an automated treatment apparatus for treating tissue samples disposed on slides, whereby the plurality of probes are configured to dispense the bulk fluids to the slides, the method comprising the steps of: locating 102 the probes near a cavity of a bulk fluid wash module of the automated treatment apparatus; dispensing 104 the bulk fluids from the probes into the cavity; and removing 106 the bulk fluids from the cavity via a scavenger port in fluid communication with the cavity.

Further aspects of the method 100 will be apparent from the above description of the apparatus 10. Persons skilled in the art will also appreciate that the method could be embodied in program code. The program code could be supplied in a number of ways, for example on a tangible computer readable medium, such as a disc or on a memory or as a data file (for example, by transmitting it from a server).

In an embodiment, the controller of the apparatus 10 implements modules on a processor in connection with instructions stored in a memory to control movement and reagent dispensing for each BFR 14 and FTP robot 17. It will be appreciated by those persons skilled in the art that the memory may reside in the computer housed in the apparatus 10 or may be hosted remote from the computer in data communication with the controller.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The discussion of documents, acts, materials, devices, articles and the like is comprised in this specification solely for the purpose of providing a context for the present invention. It is not suggested or represented that any or all of these matters formed part of the prior art base or were common general knowledge in the field relevant to the present invention as it existed before the priority date of each claim of this application.

Throughout the description and claims of this specification, the word "comprise" and variations of the word, such as "comprising" and "comprises", is not intended to exclude other additives, components, integers or steps.

The invention claimed is:

1. A bulk fluid wash module for an automated treatment apparatus for treating tissue samples disposed on slides, the bulk fluid wash module comprising:

a body;

a cavity disposed in the body, the cavity having an opening at a top of the body and being configured to receive a plurality of bulk fluids dispensed from a plurality of probes of a bulk fluid robot of the automated treatment apparatus, whereby the plurality of probes are configured to dispense the plurality of bulk fluids to the slides and to the cavity;

a scavenger port disposed in the body, the scavenger port in fluid communication with the cavity inside the body and configured to remove the plurality of bulk fluids from the cavity, wherein the scavenger port comprises:

a top opening at the top of the body that is spaced from the opening of the cavity, the top opening being configured to receive a scavenger probe configured to apply a vacuum force to remove the plurality of bulk fluids from the cavity;

a bottom opening within the body adjacent a bottom of the body; and a scavenger cavity extending within the body from the top opening of the scavenger port to the bottom opening of the scavenger port; and a collection point forming a channel that extends within the body between a bottom end of the cavity and the bottom opening of the scavenger port such that the top opening of the scavenger port is fluidly connected to the cavity inside the body via the channel formed by the collection point, the bottom opening of the scavenger port, and the scavenger cavity of the scavenger port.

2. The bulk fluid wash module of claim 1, wherein the plurality of bulk fluids are supplied to the plurality of probes via a plurality of lines connected to a plurality of bulk fluid containers and the cavity is configured to receive at least part of the plurality of bulk fluids in each of the lines.

3. The bulk fluid wash module of claim 2, wherein the top opening of the scavenger port is chamfered to guide the scavenger probe to be received in the scavenger port.

4. The bulk fluid wash module of claim 2, further comprising a bottom scavenger port configured to provide an opening in a side of the body to output the plurality of bulk fluids from the cavity, wherein the bottom scavenger port is connected to the channel formed by the collection point and in fluid communication with the bottom end of the cavity and the bottom opening of the scavenger port.

5. The bulk fluid wash module of claim 1, wherein the cavity comprises a flow channel with a slope configured to provide a substantially uniform flow of the plurality of bulk fluids dispensed from the plurality of probes to the scavenger port, an end of the flow channel comprising the bottom end of the cavity.

6. The bulk fluid wash module of claim 5, wherein a first one of the plurality of probes is configured to dispense a wash fluid and the wash fluid flows through the flow channel of the cavity to remove the plurality of bulk fluids dispensed from other ones of the plurality of probes from the cavity.

7. The bulk fluid wash module of claim 1, wherein the body comprises a top plane at the top of the body such that the opening of the cavity is formed in the top plane, and the plurality of probes are configured to dispense the plurality of bulk fluids to the cavity near the top plane of the cavity.

8. The bulk fluid wash module of claim 7, wherein the cavity is configured to receive the plurality of probes below the top plane of the cavity.

9. The bulk fluid wash module of claim 7, wherein the cavity comprises a plurality of probe ports configured to receive each of the plurality of probes.

10. The bulk fluid wash module of claim 1, further including a liquid level sensor configured to sense an amount of dispensed bulk fluid in the cavity.

11. The bulk fluid wash module of claim 1, further including a pressure sensor configured to sense a pressure in the scavenger port.

12. The bulk fluid wash module of claim 1, wherein the cavity comprises a spiral flow channel having a constant downward slope.

13. The bulk fluid wash module of claim 1, wherein the channel formed by the collection point extends horizontally within the body.

14. The bulk fluid wash module of claim 5, wherein the flow channel comprises a rounded bottom.

15. A method of removing bulk fluids from a plurality of probes of a bulk fluid robot of an automated treatment apparatus for treating tissue samples disposed on slides, whereby the plurality of probes are configured to dispense the bulk fluids to the slides, the method comprising:

locating the plurality of probes near a cavity of a bulk fluid wash module of the automated treatment apparatus, the bulk fluid wash module comprising:

a body;

the cavity disposed in the body, the cavity having an opening at a top of the body and being configured to receive a plurality of the bulk fluids dispensed from the plurality of probes of the bulk fluid robot of the automated treatment apparatus;

a scavenger port disposed in the body, the scavenger port in fluid communication with the cavity inside the body and configured to remove the plurality of the bulk fluids from the cavity, wherein the scavenger port comprises:

a top opening at the top of the body that is spaced from the opening of the cavity, the top opening being configured to receive a scavenger probe configured to apply a vacuum force to remove the plurality of the bulk fluids from the cavity;

a bottom opening within the body adjacent a bottom of the body; and a scavenger cavity extending within the body from the top opening of the scavenger port to the bottom opening of the scavenger port; and a collection point forming a channel that extends within the body between a bottom end of the cavity and the bottom opening of the scavenger port such that the top opening of the scavenger port is fluidly connected to the cavity inside the body via the channel formed by the collection point, the bottom opening of the scavenger port, and the scavenger cavity of the scavenger port;

dispensing the bulk fluids from the plurality of probes into the cavity; and removing the bulk fluids from the cavity via the top opening of the scavenger port.

\* \* \* \* \*